United States Patent Office 2,813,566
Patented Nov. 19, 1957

2,813,566

PROCESSES FOR PRODUCING VULCANIZED RUBBER COMPOSITIONS, AND PRODUCTS THEREOF

Giovanni A. Ruggeri and Attilio Angioletti, Milan, Italy, assignors to Pirelli, Società per Azioni, Milan, Italy No Drawing. Application December 1, 1954, Serial No. 472,524

Claims priority, application Italy December 3, 1953

14 Claims. (Cl. 152—330)

This invention relates to a process for producing vulcanized rubber articles having improved physical characteristics and to the products of such process.

In general, the invention comprehends the addition of both an aldimine derived from a primary amine and a dihydric phenol to a rubber composition which is vulcanizable with sulfur, followed by vulcanization of such composition.

Many attempts have been made in the past to improve the physical characteristics of vulcanized rubber products, particularly those containing light-colored hydrophylic fillers characterized by a reinforcing action, such as the colloidal silicic acids, calcium silicates, aluminum silicates, aluminum hydroxides, and other well known fillers of this kind. An improvement in the breaking load or tensile strength of such vulcanizates can be obtained by incorporating an aldimine in the rubber composition before vulcanization. But the addition of aldimines alone results in only a relatively small improvement in other important physical properties of the vulcanized product, such as hysteresis and the resistance to abrasion and to fatigue. Accordingly, it can be assumed that the improvement in tensile strength is essentially due to the well-known accelerating action of the aldimine. In fact, similar results can be obtained by using, instead of aldimines, other ingredients having an accelerating action such as triethanolamine.

We have discovered that the addition, before vulcanization, of both at least one aldimine and at least one dihydric phenol to a rubber composition containing a reinforcing filler will result not only in improvement in tensile strength but also in very substantial and unexpected improvements in resistance to abrasion and fatigue and a marked reduction of hysteresis and load relaxation. Further, the addition of both an aldimine and a dihydric phenol results in improvement of the electrical properties of the vulcanized product, such as the electrical insulation resistance and dielectric strength, as well as a notable reduction in water absorption, swelling in solvents and in plasticizers, and permeability to gases.

While the invention was initially intended to improve the physical characteristics of vulcanized rubber compounds containing light-colored hydrophylic fillers, we have discovered that the invention is generally applicable to all rubber compounds containing fillers or filler mixtures of any kind, and is therefore also applicable to rubber compositions containing active carbon blacks. Since the active carbon blacks themselves tend to produce good physical properties in vulcanized rubber products, it will be understood that the improvements resulting from practice of the present invention are less when the filler is an active carbon black than when the filler is a light-colored hydrophylic material.

The invention is applicable to all kinds of rubber which can be vulcanized with sulfur. Thus, the term "rubber" as herein employed includes natural rubber, synthetic rubbers from the butadiene-styrene copolymers, synthetic rubbers from the butadiene-acrylonitrile copolymers or the isobutylene-isoprene copolymers, and mixtures of natural rubber with the butadiene-styrene copolymers.

The invention is of particular importance in that it makes possible, for the first time, the production of certain rubber products, particularly products such as pneumatic tires which must have unusually good physical characteristics, in colors other than black. Thus, according to the invention, we are able to produce with light-colored fillers vulcanized rubber products which have heretofore been practical only when active carbon blacks were employed. Further, when the best light-colored fillers are employed with natural rubber, or natural rubber and synthetic rubber made from butadiene-styrene copolymers, and the two addition agents added in accordance with the invention are a bifunctional dialdimine and resorcinol, the mechanical properties of the vulcanized product are even better than those obtained by employing the corresponding rubber with active carbon black. In particular, products of the present invention may have a higher tensile strength, a considerably lower hysteresis value, better resistance to fatigue cracking and breaks and to ozone, and a lower load relaxation than is obtainable with corresponding compositions based on carbon black.

In this connection, we have made, in accordance with the invention, pneumatic tires wherein the tread rubber contained light-colored fillers and was free from carbon black, and these tires compared advantageously with conventional tires made with tread rubber containing active carbon blacks but without the special ingredients of the present invention. We have also obtained very good results when not just the tread but the entire tire, including the carcass, is made with rubber compounds containing light colored fillers and the special ingredients of the invention.

While the general class of aldimines derived from primary amines are useful in accordance with the present invention, we have found that the bifunctional dialdimines which can be obtained by reacting primary diamines with furfural in a molar ratio of 1:2 are particularly effective. Typical diamines which can be employed to prepare such dialdimines are the alkylidene-diamines and arylidenediamines, including the polymethylene-diamines, phenylenediamines and naphthylene-diamines, examples of which are hexamethylenediamine, di-beta-aminoethyl sulfide, p-phenylenediamine, 1,5-naphthylenediamine, etc. Typical dialdimines which we have found to be particularly useful in the present invention are difurfurylidene-hexamethylenediamine, difurfurylidene-di-beta-aminoethyl sulfide, difurfurylidene-p-phenylenediamine, and difurfurylidene - 1,5 - naphthylenediamine. These dialdimines can also be used as vulcanization accelerators.

The dihydric phenols in general are useful in accordance with the invention and we have found resorcinol, either alone or with hydroquinone, to be particularly effective.

In general, we may employ the aldimine and phenol in combined amounts which are always relatively small in relation to the rubber content, such amounts not exceeding about 25% of the weight of filler employed. While the greatest improvement in physical properties of the vulcanized rubber product is obtained when larger proportions of aldimine and phenol are employed, good results can be obtained with proportions of these ingredients totalling 2% of the weight of the filler and less. As the proportion of the special ingredients is reduced below 2% of the weight of the filler, the resulting improvement in physical characteristics of the vulcanized product will gradually become correspondingly less satisfactory.

We have discovered that the amount of aldimine required to produce the advantageous results of the invention can be reduced, and the cost of the process thus decreased without prejudice to good technical results, if hexamethylenetetramine, which is already known as a vulcanization accelerator, is included as a substitute for a portion of the aldimine. When a noticeable amount of hexamethylenetetramine is employed, the proportion of aldimine to phenol may be on the order of one part by weight aldimine for each three parts by weight phenol. When hexamethylenetetramine is omitted, the proportions may be on the order of three parts aldimine for each part phenol. When hexamethylenetetramine is included, the weight ratio of phenol to hexamethylenetetramine will be at least about 3:2. The aldimines and dihydric phenols may be incorporated directly in the rubber composition so that their plastifying properties can be exploited to facilitate the milling of the rubber. On the other hand, these special ingredients may advantageously be distributed on the surface of the granules of the filler before the filler is incorporated in the rubber composition, in which case somewhat greater improvement in the physical characteristics of the vulcanized product is obtained. Thus, we may prepare an intimate mixture of the particulate filler with the aldimine and phenol, maintain the mixture under vacuum, and subject the resulting mixture to heat while still under vacuum, before incorporating in the rubber composition.

EXAMPLE I

Three groups of test samples were compared to demonstrate the improved results of the invention. The first includes only composition A including carbon black in a conventional rubber composition. The second group includes compositions B, E and L including respectively a fine particle colloidal silicic acid (silicon dioxide content about 96%), a fine particle calcium silicate, and a fine particle colloidal aluminum hydroxide as the light colored hydrophylic filler, but no aldimine and no phenol. The third group includes compositions C, D, F, H, M and N each including one of the light colored hydrophylic fillers just mentioned and also including both a bifunctional dialdimine and a dihydric phenol.

In preparing compositions B, E and L the zinc oxide, accelerators, antioxidants, plasticizers and sulfur were incorporated in the rubber after the filler had been added. In preparing compositions C, D, F, H, M and N, the phenol was added immediately after addition of the filler, the conventional ingredients excluding sulfur were then incorporated, and the aldimine then added before the sulfur. Test samples of compositions B–N were vulcanized for 30 minutes at 143° C. After vulcanization, the test samples of compositions B–N exhibited a light amber color. The color of compositions B–N may be varied at will by adding the conventional whitening and coloring agents for rubber.

Composition A

| | Parts by weight |
|---|---|
| Natural rubber (smoked sheets) | 100 |
| Channel gas black | 47 |
| Zinc oxide | 5 |
| Mercaptobenzothiazole | 1 |
| Phenyl-beta-naphthylamine | 1 |
| Stearic acid | 3 |
| Pine tar | 2 |
| Sulfur | 3 |

Specimens of composition were vulcanized for 40 minutes at 143° C.

| | Parts by Weight | | | | | | | | |
|---|---|---|---|---|---|---|---|---|---|
| Composition | B | C | D | E | F | H | L | M | N |
| Natural rubber (smoked sheets) | 100 | 100 | 100 | 100 | 100 | 100 | 100 | 100 | 100 |
| Silicic acid | 32 | 32 | 32 | | | | | | |
| Calcium silicate | | | | 36 | 36 | 36 | | | |
| Aluminum hydroxide | | | | | | | 32 | 32 | 32 |
| Resorcinol | | 2.2 | 2.2 | | 2.2 | 2.2 | | 2.2 | 2.2 |
| Zinc Oxide | 5 | 5 | 5 | 5 | 5 | 5 | 5 | 5 | 5 |
| Benzothiazylcyclo-hexylsulfeneamide | 2 | 2 | 2 | 1 | 1 | 1 | 1.5 | 1.5 | 1.5 |
| Hexamethylenetetramine | .5 | .5 | .5 | .5 | .5 | .5 | .5 | .5 | .5 |
| Phenyl-beta-naphthylamine | 1 | 1 | 1 | 1 | 1 | 1 | 1 | 1 | 1 |
| Stearic acid | 2 | 2 | 2 | 2 | 2 | 2 | 2 | 2 | 2 |
| Paraffin wax | 1 | 1 | 1 | 1 | 1 | 1 | 1 | 1 | 1 |
| Difurfurylidene - hexamethylenediamine | | 1.2 | | | 1.2 | | | 1.2 | |
| Difurfurylidene-p-phenylenediamine | | | 1.2 | | | 1.2 | | | 1.2 |
| Sulfur | 3.5 | 3.5 | 3.5 | 3.5 | 3.5 | 3.5 | 3.5 | 3.5 | 3.5 |

The vulcanized specimens were compared by subjecting them to the following tests:

(1) Tension test on ring-shaped specimen with Schopper dynamometer to obtain the specific load at 300% elongation (SL3), the tensile strength at break (TS) expressed in kg./sq. cm., and the elongation at break (EB) in percent of the initial length.

(2) Hysteresis (K) at constant strain and at room temperature, in joule/cu. cm./cycle and referred to one radiant shear strain. Test carried out by means of a rubber hysteresimeter of the type described by S. Oberto and G. Palandri in the Rubber Age, vol. 63, pages 725–734 (1948).

(3) Abrasion wear (AW) by means of Du Pont-Grasselli machine and expressed in cu. mm. of abraded material for a run of 50 metres on sandpaper on standard test pieces (4 sq. cm. surface) at a speed of 2.5 m. per minute.

(4) Fatigue tests (FT) by repeated flexings at 80° C. on De Mattia machine in accordance with ASTM specifications. Results are expressed in terms of the number of cycles necessary before cracks on the specimens become clearly visible to the naked eye.

The results of these tests are tabulated as follows:

| | SL3 | TS | EB | K | AW | FT |
|---|---|---|---|---|---|---|
| A | 115 | 265 | 510 | 0.90 | 330 | 400,000 |
| B | 42 | 250 | 650 | 0.40 | 480 | 80,000 |
| C | 105 | 280 | 570 | 0.25 | 310 | 900,000 |
| D | 100 | 280 | 550 | 0.25 | 330 | 900,000 |
| E | 54 | 205 | 550 | 0.40 | 600 | 150,000 |
| F | 60 | 210 | 550 | 0.20 | 400 | 600,000 |
| H | 70 | 230 | 550 | 0.20 | 400 | 400,000 |
| L | 90 | 203 | 490 | 0.19 | 380 | 90,000 |
| M | 104 | 254 | 520 | 0.17 | 320 | 450,000 |
| N | 97 | 232 | 490 | 0.16 | 350 | 250,000 |

From examination of this table it will be seen that addition of both the aldimine and phenol in a vulcanizable rubber composition containing light colored fillers improves the mechanical properties of the vulcanized product to a very material extent which varies according to the particular filler employed. It is also apparent that the values obtained for the vulcanized specimens prepared from compositions C and D, containing an aldimine, a phenol and colloidal silicic acid, are in every respect better than the corresponding values obtained for composition A, containing active carbon black without the special ingredients of this invention.

Several different sizes of passenger and truck tires were made for comparison, one of each size having its tread portion made from composition A and another having its tread portion made from composition C. The tire carcasses were manufactured in exactly the same way from the same natural rubber compositions so that a true comparison between compositions A and B could be made. Some of the corresponding pairs of tires were submitted to life tests on a laboratory testing wheel and others to practical road tests.

The laboratory tests showed the flex-cracking resistance of the treads made of composition C to be very good and the life characteristics of the tires with these new treads proved to be superior to those of tires with treads made of conventional composition A. Under the same load and speed conditions in the laboratory tests, the tires having treads made from composition C showed much less tendency to heat than did those having treads of conventional composition A. Thus, even inside the inner tubes, average temperatures were 7–12° C. lower in tires employing treads of composition C.

Many passenger and truck tires made with the new treads have run more than 40,000 kilometers and for these tires the wear characteristics have proved to be about the same as those of tires having treads of natural rubber containing active carbon black. For example, wear tests were made to compare three 11.00–22 tires having treads of composition C with three like tires having treads of composition A. One of the three composition C tires was mounted on the front wheel of a lorry, the other two being mounted on a dual rear wheel of the lorry. The composition A tires were correspondingly mounted on the lorry. Wear check results were:

|  | Millimeter |
|---|---|
| Depth of tread grooves when new (all tires) | 13 |
| Average groove depth after running 20,000 km.: |  |
| Treads of composition C | 9.8 |
| Treads of composition A | 9.9 |

It was also noted that during use the treads made from composition C showed less tendency to crack than do conventional treads.

Two electrical cables were made, one insulated with composition B and the other with composition C, each vulcanized in saturated steam at a gage pressure of 3 kg./sq. cm. for 30 minutes. The electrical resistance in each of these cables was measured after they had been immersed in tap water at 15° C., the values obtained, expressed in ohm-centimeters, being as follows:

| Cable insulated with composition B | $3.85 \times 10^{13}$ |
|---|---|
| Cable insulated with composition C | $2.10 \times 10^{15}$ |

While the resistivity of composition B was insufficient for practical application, that of composition C was entirely satisfactory.

The dielectric strength of the vulcanizates, determined for non-conditioned specimens from the two compositions, was 16% greater for composition C than for composition B. The dielectric strength of specimens conditioned in distilled water at 60° C. for 72 hours was 120% more for composition C than for composition B.

Specimens of compositions B, C and D, vulcanized for 30 minutes at 143° C., were submitted to tests to determine air-permeability, swelling in gasoline and paraffin oil, and water absorption. These tests disclosed the following percentage reductions for compositions C and D as compared to composition B:

|  | Compounds | |
|---|---|---|
|  | C | D |
|  | Percent | Percent |
| Reduction in Air-Permeability at 20° C. | 28 | 25 |
| Reduction in swelling in gasoline at 20° C. | 18 | 15 |
| Reduction in swelling in paraffin oil at 100° C. | 20 | 18 |
| Reduction in water absorption | 18 | 13 |

The foregoing tests thus show that there is always a considerable improvement in the physical characteristics of the vulcanized product when both an aldimine and a phenol are employed.

EXAMPLE II

A natural rubber composition similar to composition C but employing a larger proportion of the aldimine and omitting hexamethylenetetramine was prepared as follows:

*Composition S*

| | Parts by weight |
|---|---|
| Natural rubber (smoked sheets) | 100 |
| Silicic acid | 32 |
| Resorcinol | 2.2 |
| Zinc oxide | 5 |
| Benzothiazylcyclohexylsulpheneamide | 2 |
| Phenyl-beta-naphthylamine | 1 |
| Stearic acid | 2 |
| Paraffin wax | 1 |
| Difurfurylidene-hexamethylenediamine | 4 |
| Sulfur | 4.5 |

Specimens prepared from composition S by vulcanizing for 30 minutes at 143° C. were tested in the same manner hereinbefore described with reference to composition A–N, the results being as follows:

| Specific load at 300% elongation | kg./sq. cm. | 150 |
|---|---|---|
| Tensile strength | kg./sq. cm. | 320 |
| Elongation at break | percent | 500 |
| Hysteresis | joule/cu. cm./cycle | 0.22 |
| Abrasion wear (Du Pont Grasselli machine) | cu. mm. | 285 |

It will be noted that these results are all better than those obtained for specimens prepared by vulcanizing composition C. In most industrial cases, however, it appears advisable to employ composition C because of the reduction in cost resulting from use of a smaller dose of difurfurylidene-hexamethylenediamine.

EXAMPLE III

A composition similar to composition C but wherein natural rubber was partly replaced by a synthetic rubber commonly known as "cold rubber" (made of a butadiene-styrene copolymer having about 22% by weight styrene obtained in emulsion at 5° C.) was prepared as follows:

*Composition T*

| | Parts by weight |
|---|---|
| Natural rubber (smoked sheets) | 80 |
| Cold rubber (butadiene-styrene copolymer) | 20 |
| Silicic acid | 32 |
| Resorcinol | 2.2 |
| Zinc oxide | 5 |
| Benzothiazylcyclohexylsulpheneamide | 2 |
| Hexamethylenetetramine | 0.5 |
| Phenyl-beta-naphthylamine | 1 |
| Stearic acid | 2 |
| Paraffin wax | 1 |
| Difurfurylidene-hexamethylenediamine | 1.2 |
| Sulfur | 3.5 |

Specimens prepared from composition T by vulcanizing for 30 minutes at 143° C. and exhibiting a light amber color were subjected to the tests hereinbefore described with reference to Example I, the results being as follows:

Specific load at 300% elongation ____ kg./sq. cm__ 150
Tensile strength _____ kg./sq. cm__ 230
Elongation at break _____ percent__ 430
Hysteresis _____ joule/cu. cm./cycle__ 0.33
Abrasion wear _____ cu. cm__ 240

The fatigue resistance test carried out by subjecting the specimen to repeated flexings at 80° C. on the De Mattia machine gave a value higher than 1,800,000 cycles.

The resistance to abrasion exhibited by specimens obtained by vulcanizing composition T is considerably better than in the case of composition C and approaches that of conventional cold rubber compositions containing active carbon blacks without the special ingredients of this invention, such conventional cold rubber compositions being normally used for pneumatic tire treads and considered to be highly resistant to abrasion. Specimens prepared by vulcanizing composition T have, in comparison with such conventional cold rubber compositions, a higher tensile strength, lower hysteresis values, and a decidedly better resistance to fatigue crackings and breaks. Accordingly, composition T is highly useful for the manufacture of tire treads, conveyor belt covers for handling abrasive materials, and like products.

Rubber products having still greater resistance to abrasion, even greater than for conventional cold rubber compositions containing active carbon blacks without the special ingredients of this invention, can be obtained by increasing the proportion of cold rubber over that contained in composition T and adding carbon black as well as the special ingredients of this invention. This results, however, in correspondingly less satisfactory hysteresis values and a lower resistance to fatigue.

The invention is highly advantageous in the production of rubber articles subject to intense mechanical stresses during use, as is the case with pneumatic, semi-pneumatic and solid tires, conveyor belts, drive belts, shock absorbers, elastic threads and the like. Owing to their improved electrical properties, compositions produced in accordance with the invention are particularly useful for insulation of electrical cables, especially submarine cables. Because of the improved properties of relative impermeability to gases and resistance to water, oils, solvents, plasticizers, and organic substances in general, shown by vulcanizates produced in accordance with the invention, it is particularly applicable to the manufacture of inner tubes, balls, hose, rollers, tank liners, rubberized fabrics and many other articles. When necessary, synthetic rubbers may be employed as part or all of the rubber content of products made in accordance with the invention. Thus, the serviceability of hose for mineral oils and fuel, and of inking rollers, made with compositions based on synthetic rubbers made of butadiene-acrylonitrile copolymers, which normally contain reinforcing fillers, may be improved by the addition of both an aldimine and a phenol in accordance with the invention. The serviceability of pneumatic inner tubes made with compositions based on isobutylene-isoprene copolymers is also greatly improved when an aldimine and a dihydric phenol are employed in accordance with the invention.

It is to be understood that articles produced in accordance with the invention need not be fabricated entirely from the novel rubber composition herein disclosed. Thus, the articles may be made in part of the novel compositions and in part of conventional rubber compositions. Similarly, the articles may include any of the useful non-rubber materials, such as textiles, metals, etc.

While the foregoing disclosure has described the use of only one aldimine in each specific composition, it is to be understood that the desired aldimine content of the composition may consist of a plurality of the different aldimines disclosed. Thus, for instance, the difurfurylidene-hexamethylenediamine of composition C may be replaced in part by difurfurylidene-p-phenylenediamine or any other compatible aldimine useful in accordance with the invention. Similarly, the desired phenol content of the composition may be made up of a plurality of different dihydric phenols.

We claim:

1. A method for producing vulcanized rubber products having improved physical characteristics from a vulcanizable rubbery material containing at least one filler and selected from the group consisting of natural rubber, rubbery butadiene-styrene, butadiene-acrylonitrile and isobutylene-isoprene copolymers and mixtures of natural rubber and butadiene-styrene copolymers, comprising incorporating in such material at least one bifunctional dialdimine derived from a primary diamine and furfural, and at least one dihydric phenol, the combined proportion of dialdimine and phenol not materially exceeding 25% of the weight of said filler with the weight ratio of dialdimine to phenol being in the range of from about 3:1 to about 1:3, and vulcanizing the material.

2. A method in accordance with claim 1 wherein said dialdimine is selected from the group consisting of difurfurylidene-hexamethylenediamine and difurfurylidene-p-phenylenediamine.

3. A method in accordance with claim 1 wherein said phenol is resorcinol.

4. A method in accordance with claim 1 wherein said dialdimine is selected from the group consisting of difurfurylidene-hexamethylenediamine and difurfurylidene-p-phenylenediamine, and said phenol is resorcinol.

5. A method for producing light colored vulcanized rubber products having improved physical properties from a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers comprising incorporating in such material a colloidal silicic acid filler, at least one bifunctional dialdimine derived from a primary diamine and furfural, and at least one dihydric phenol, the combined proportion of dialdimine and phenol not materially exceeding 25% of the weight of said filler with the weight ratio of dialdimine to phenol being in the range of from about 3:1 to about 1:3, and vulcanizing said material.

6. A method in accordance with claim 5 wherein said dialdimine is selected from the group consisting of difurfurylidene-hexamethylenediamine and difurfurylidene-p-phenylenediamine, and said phenol is resorcinol.

7. A method for producing vulcanized rubber products having improved physical characteristics from a vulcanizable rubbery material containing at least one filler and selected from the group consisting of natural rubber, rubbery butadiene-styrene, butadiene-acrylonitrile and isobutylene-isoprene copolymers and mixtures of natural rubber and butadiene-styrene copolymers, comprising incorporating in such material at least one dialdimine selected from the group consisting of difurfurylidene-hexamethylenediamine and difurfurylidene-p-phenylenediamine, resorcinol and hydroquinone, the combined weight of dialdimine, resorcinol and hydroquinone not materially exceeding 25% of the weight of said filler, the ratio of the weight of dialdimine to the combined weight of resorcinol and hydroquinone being from about 3:1 to about 1:3, and vulcanizing said material.

8. A light colored rubber article having improved physical characteristics and produced by vulcanizing a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers and containing a light colored hydrophylic reinforcing filler, at least one dialdimine selected from the group consisting of difurfurylidene-hexamethylenediamine and difurfurylidene-p-phenylenediamine, and resorcinol, the combined weight of dialdimine and resorcinol not materially exceeding 25% of the weight of said filler, and the weight ratio of dialdimine to resorcinol being in the range of from about 3:1 to about 1:3.

9. A pneumatic tire portions of which are produced by vulcanizing a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers and including a light colored reinforcing filler, at least one bifunctional dialdimine derived from a primary diamine and furfural, and at least one dihydric phenol, the combined weight of dialdimine and phenol not materially exceeding about 25% of the weight of said filler, and the weight ratio of dialdimine to phenol being in the range of from about 3:1 to about 1:3.

10. A pneumatic tire characterized by reduced running temperatures and improved resistance to flex-cracking, the tread portion of said tire being produced by vulcanizing a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers and including a light colored hydrophylic reinforcing filler, at least one bifunctional dialdimine derived from a primary diamine and furfural, and at least one dihydric phenol, the combined weight of dialdimine and phenol not materially exceeding 25% of the weight of said filler, and the weight ratio of dialdimine to phenol being in the range of from about 3:1 to about 1:3.

11. An electrical conductor having an insulating covering produced by vulcanizing a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers and including a filler, at least one bifunctional dialdimine derived from a primary diamine and furfural, and at least one dihydric phenol, the combined weight of dialdimine and phenol not materially exceeding 25% of the weight of said filler, and the weight ratio of dialdimine to phenol being in the range of from about 3:1 to about 1:3.

12. A method for producing light colored vulcanized rubber products having improved physical properties from a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers, comprising incorporating in such material a light colored hydrophylic reinforcing filler, at least one bifunctional dialdimine derived from a primary diamine and furfural, and at least one dihydric phenol, the combined weight of dialdimine and phenol not materially exceeding 25% of the weight of said filler with the weight ratio of dialdimine to phenol being in the range of from about 3:1 to about 1:3, and vulcanizing said material.

13. A method for producing vulcanized rubber products having improved physical characteristics comprising intimately contacting a particulate filler with at least one bifunctional dialdimine derived from a primary diamine and furfural, and at least one dihydric phenol, the combined weight of dialdimine and phenol not materially exceeding 25% of the weight of said filler with the weight ratio of dialdimine to phenol being in the range of from about 3:1 to about 1:3, incorporating the resulting intimate mixture in a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers, and vulcanizing said material.

14. A rubber article having improved physical characteristics and produced by vulcanizing a vulcanizable rubbery material selected from the group consisting of natural rubber, rubbery butadiene-styrene, butadiene-acrylonitrile and isobutylene-isoprene copolymers and mixtures of natural rubber and butadiene-styrene copolymers and containing at least one filler, at least one bifunctional dialdimine derived from a primary diamine and furfural, and at least one dihydric phenol, the combined weight of dialdimine and phenol not materially exceeding 25% of the weight of said filler, the weight ratio of dialdimine to phenol being in the range of from about 3:1 to about 1:3.

References Cited in the file of this patent
UNITED STATES PATENTS 1,503,702    Morton _____ Aug. 5, 1924